United States Patent
Miller et al.

(10) Patent No.: US 9,204,621 B1
(45) Date of Patent: Dec. 8, 2015

(54) PET COAT

(71) Applicant: Dog Body LLC, Lumberton, NJ (US)

(72) Inventors: Wendy Fay Miller, Lumberton, NJ (US); Jordan Miller Drewes, Easton, PA (US)

(73) Assignee: Dog Body, LLC, Lumberton, NJ (US)

( * ) Notice: Subject to any disclaimer, the term of this patent is extended or adjusted under 35 U.S.C. 154(b) by 0 days.

(21) Appl. No.: 14/600,050

(22) Filed: Jan. 20, 2015

Related U.S. Application Data

(60) Provisional application No. 61/998,140, filed on Jun. 19, 2014.

(51) Int. Cl.
*A01K 13/00* (2006.01)
*A01K 27/00* (2006.01)

(52) U.S. Cl.
CPC ............ *A01K 13/006* (2013.01); *A01K 27/002* (2013.01)

(58) Field of Classification Search
CPC . A01K 13/006; A01K 27/002; A01K 1/0263; A01K 13/008; Y10S 119/907
USPC .......................................... 119/850, 792, 907
See application file for complete search history.

(56) References Cited

U.S. PATENT DOCUMENTS

| | | | | |
|---|---|---|---|---|
| 2,273,706 | A * | 2/1942 | Hafner | 54/79.1 |
| 5,894,817 | A * | 4/1999 | Manuel | 119/497 |
| 5,996,537 | A * | 12/1999 | Caditz | 119/850 |
| 6,138,611 | A | 10/2000 | Thielemann | |
| 6,431,123 | B1 * | 8/2002 | Hibbert | 119/850 |
| 6,820,574 | B2 * | 11/2004 | Sharpe | 119/820 |
| 8,210,131 | B2 * | 7/2012 | Friedland | 119/850 |
| 2005/0263102 | A1 * | 12/2005 | Sherman et al. | 119/792 |
| 2005/0263104 | A1 | 12/2005 | Lazarowich | |
| 2006/0090711 | A1 * | 5/2006 | Richards | 119/850 |
| 2008/0134991 | A1 | 6/2008 | DePass | |
| 2008/0223310 | A1 | 9/2008 | Remick et al. | |
| 2009/0120377 | A1 | 5/2009 | Palmer | |
| 2011/0174237 | A1 * | 7/2011 | Sanders-Luckman et al. | 119/792 |
| 2012/0024239 | A1 * | 2/2012 | Forbes | 119/850 |
| 2013/0276719 | A1 | 10/2013 | Ferrando | |

FOREIGN PATENT DOCUMENTS

DE 202006000218 U1 3/2006
GB 2373760 A 10/2002

OTHER PUBLICATIONS

Anonymous, Ancol Pink City Coat, webpage, 2014, Seapets, LTD. Colchester, Essex, GB.
Anonymous, PawZ 1Z Warm Dog Coat with Built in Harness, webpage, 2014, TopDogs.com.au, Queensland, Australia.

* cited by examiner

*Primary Examiner* — Monica Williams
*Assistant Examiner* — Richard G Davis
(74) *Attorney, Agent, or Firm* — Werschulz Patent Law, LLC

(57) ABSTRACT

A pet garment having a coat and an integrated harness that is placed on the pet without the garment going over the pet's head. The integrated harness cording is in channels within the coat. The coat has a lengthwise opening with a fastener that extends from the hemline to the neckline of the coat, the opening over a pet's dorsal side. The coat has a protective outer layer, an inner lining layer and leg openings. The integrated harness cording merges together when the opening closes and the leash easily attaches to the harness cording ends gathered together adjacent to the closed opening. The coat covers the underbelly, leaving a concave scallop for the pet's genitals. The pet merely steps into the coat with the opening open without the coat going over the pet's head.

11 Claims, 9 Drawing Sheets ved by like reference numerals.

PET COAT

CROSS-REFERENCE TO RELATED APPLICATIONS

This application is a nonprovisional utility application of the provisional patent application, Ser. No. 61/998,140, filed in the United States Patent Office on Jun. 19, 2014 and claims the priority thereof and is expressly incorporated herein by reference in its entirety.

TECHNICAL FIELD

The present disclosure relates generally to a pet garment. More particularly, the present disclosure relates to a pet coat with an integrated harness.

BACKGROUND

With pet ownership come many responsibilities. In particular, dog owners generally need to take their dog outside several times a day both for exercise, stimulation and for elimination. Because this is a daily occurrence regardless of the weather, the pet is sometimes exposed to rain, snow and cold. As much as a dog is loved that special "wet dog" odor is never appreciated. Toweling off the pet when the outdoor excursion is a necessary chore to prevent water from scattering around the inside of the dwelling, but adds to the workload of the owner.

Many breeds have thick coats of long hair that are well suited for cold, wet weather. However, the long hair takes time to dry. Other short hair breeds need extra protection of a garment such as a sweater, coat or raincoat to tolerate bad weather.

In most urban and suburban areas, dogs generally are not permitted to run free except in designated areas and must be on a lead attached to a collar or harness.

Many pet owners prefer a harness to a collar because they feel that they can control the pet better. When owners and guardians pull on the leash, animals are alerted to the human's level of control and intent. From a mild tug to a fierce restraint, animals are instantly aware of the expected behavior through the level of pressure the animal feels along its entire upper body. This gives the pet assurance of knowing their human is the "leader of the pack" while allowing guardians an unparalleled level of control. Harnesses allow the guardians and owners to keep their pets and themselves safe in all manner of situations without choking a pet into compliance: from a leisurely stroll to strong restraint against perceived provocations—real or imagined.

Putting on any weather protection garment is difficult for the pet guardian if the pet is on a leash attached to a harness. However, both a protective garment and a harness are essential for a pleasant outdoor experience in foul or cold weather.

To put on the harness, the owner must put the harness over the garment, which requires adjusting the harness to accommodate the extra girth created by the garment and then readjusting it when the harness is in use without the garment.

More difficult is placing the harness under the garment, which requires a garment with a hole on the back. The opening exposes the animal's back to the elements, allowing rain, sleet and snow to get in and under the garments. Some garments are available with such a hole, but generally the garment must be slit or cut open. To preserve garment durability, the hole must be stitched or finished by tape to prevent tearing and fraying. The pet guardian must accurately make the slit or cut so that pet's leash can be attached to the harness that is now under the garment.

While these remedies may be suitable for the particular purpose employed, or for general use, they would not be as suitable for the purposes of the present disclosure as disclosed hereafter.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a pet garment that protects a pet body from the weather. Accordingly, an aspect of an example embodiment in the present disclosure provides a pet garment having a coat with a protective outer garment.

Another aspect of an example embodiment in the present disclosure is to provide a pet garment that makes attaching a leash easy. Accordingly, the present disclosure provides a pet garment having an integrated harness in a protective coat that avoids having to cut the coat to fit a harness through to a leash.

A further aspect of an example embodiment in the present disclosure is to provide a pet garment with a coat and integrated harness that is easy to put on the pet. Accordingly, the present disclosure provides a pet garment with a coat and integrated harness that has a lengthwise opening over a pet's dorsal side so that the pet merely steps into the coat with the opening open without the coat going over the pet's head.

The present disclosure describes a pet garment having a coat and an integrated harness that is placed on the pet without the garment going over the pet's head. The integrated harness cording is in channels within the coat. The coat has a lengthwise opening with a fastener that extends from the hemline to the neckline of the coat, the opening over a pet's dorsal side. The coat has a protective outer layer, an inner lining layer and leg openings. The integrated harness cording merges together when the opening closes and the leash easily attaches to the harness cording ends gathered together at the opening. The coat covers the underbelly, leaving a concave scallop for the pet's genitals. The pet merely steps into the coat with the opening open without the coat going over the pet's head.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1:
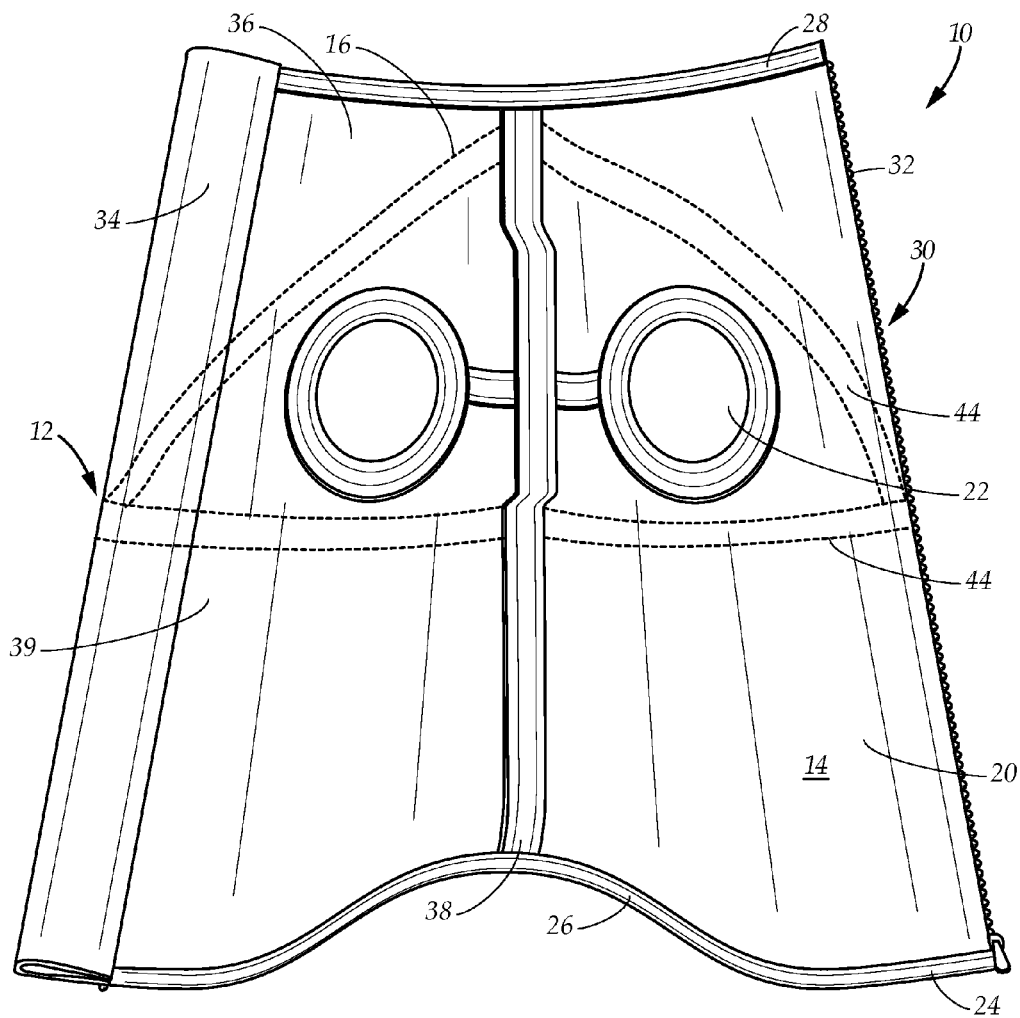
FIG. 1 is a bottom plan view of an example embodiment of an open pet garment, showing the interior of the garment.

FIG. 1 illustrates an interior side of an example embodiment of a pet garment 10 having an integrated harness. The pet garment is outdoors wear for a pet, typically a dog. The pet garment 10 includes a coat 20 and an integrated harness, described hereinbelow.

The coat has a neckline 28 and a hemline 24 and a lengthwise opening 30 extending from the neckline 28 to the hemline 24, the opening extending the entire length of the coat. The lengthwise opening 30 has a fastener 32 configured for closing the opening 30. The lengthwise opening extends over the dorsal side of the pet such that when the fastener opens, the coat 20 slips off the back of the pet without engaging the pet's head. The coat 20 has a pair of leg openings 22 configured for accommodating a pair of pet forelegs.

In one example embodiment of the pet garment 10, the coat 20 has a plurality of layers.

The coat 20 has a plurality of channels 44 terminating adjacent to the opening 30. In one example embodiment, the channels 44 are formed between the plurality of layers, by topstitching an outer protective layer and an inner lining layer 14. In another example embodiment, the channels are formed by topstitching tape strips as explained further hereinbelow.

Figure 1A:
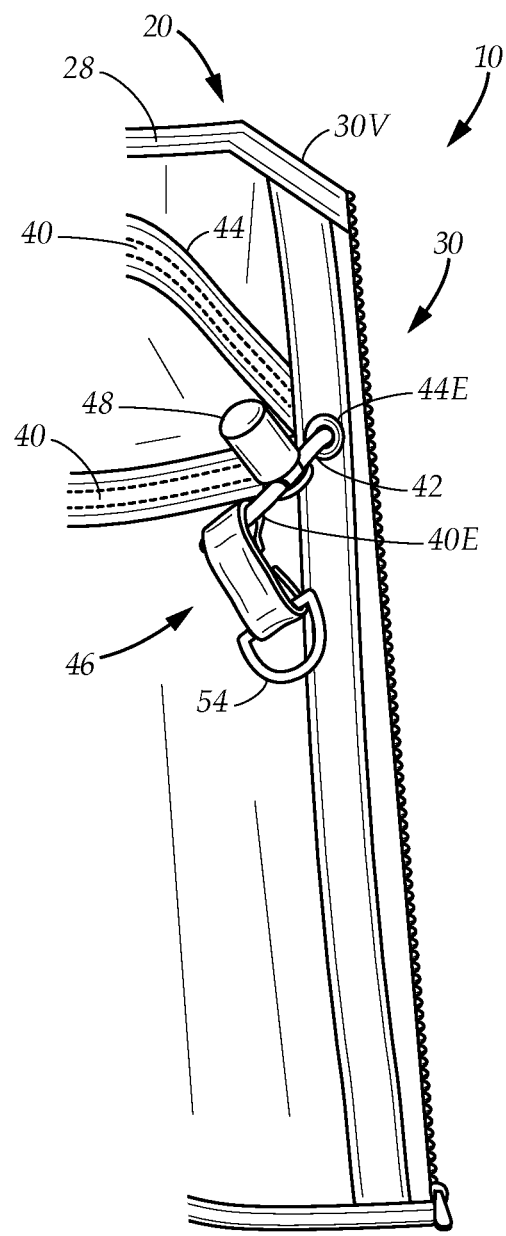
FIG. 1A is a sectional top plan view of a side edge of an example embodiment of a pet garment.

Referring to FIG. 1A showing details on the exterior side of the coat 20, a harness 40 threads through the channels 44 of the coat 20. The harness has a plurality of ends 40E extending through the channel ends 44E on each side of the opening 30.

For the purpose of this discussion, a harness is an arrangement of cording that is placed on a pet, generally around the pet's torso and around the pet's shoulders. The cording typically converges on the pet's dorsal side. Where the cording converges is a means to attach a leash. While this is a typical configuration, other harness configurations are possible within the concepts disclosed herein.

In one example embodiment, the harness cording is paracord. For the purpose of this discussion, paracord, is a lightweight nylon kernmantle rope cord with a braided sheath that has a high number of interwoven strands for its size, giving it a relatively smooth texture.

In the example embodiment illustrated in FIG. 1A, the neckline 28 has a "V-shape 30V at the opening 30.

Referring again to FIG. 1, an interior side of the coat 20 has the inner lining layer 14 that provides a soft surface next to the pet's skin to protect against rubbing and irritation. In a further example embodiment, the lining layer 14 comprises a thermal insulating fabric appropriate for cold weather, such as fleece as a non-limiting example. In another example embodiment of the pet garment, the inner lining layer 14 is a mesh fabric, appropriate for warmer weather, such as spring and fall. The mesh fabric lining is suitable for a raincoat style outer layer. In one example embodiment, wherein tape strips form the channels 44, on the exterior side, the inner lining 14 is selectively removable, allowing the thermal insulating fabric to be replaced by the mesh fabric and vice versa.

Figure 2:
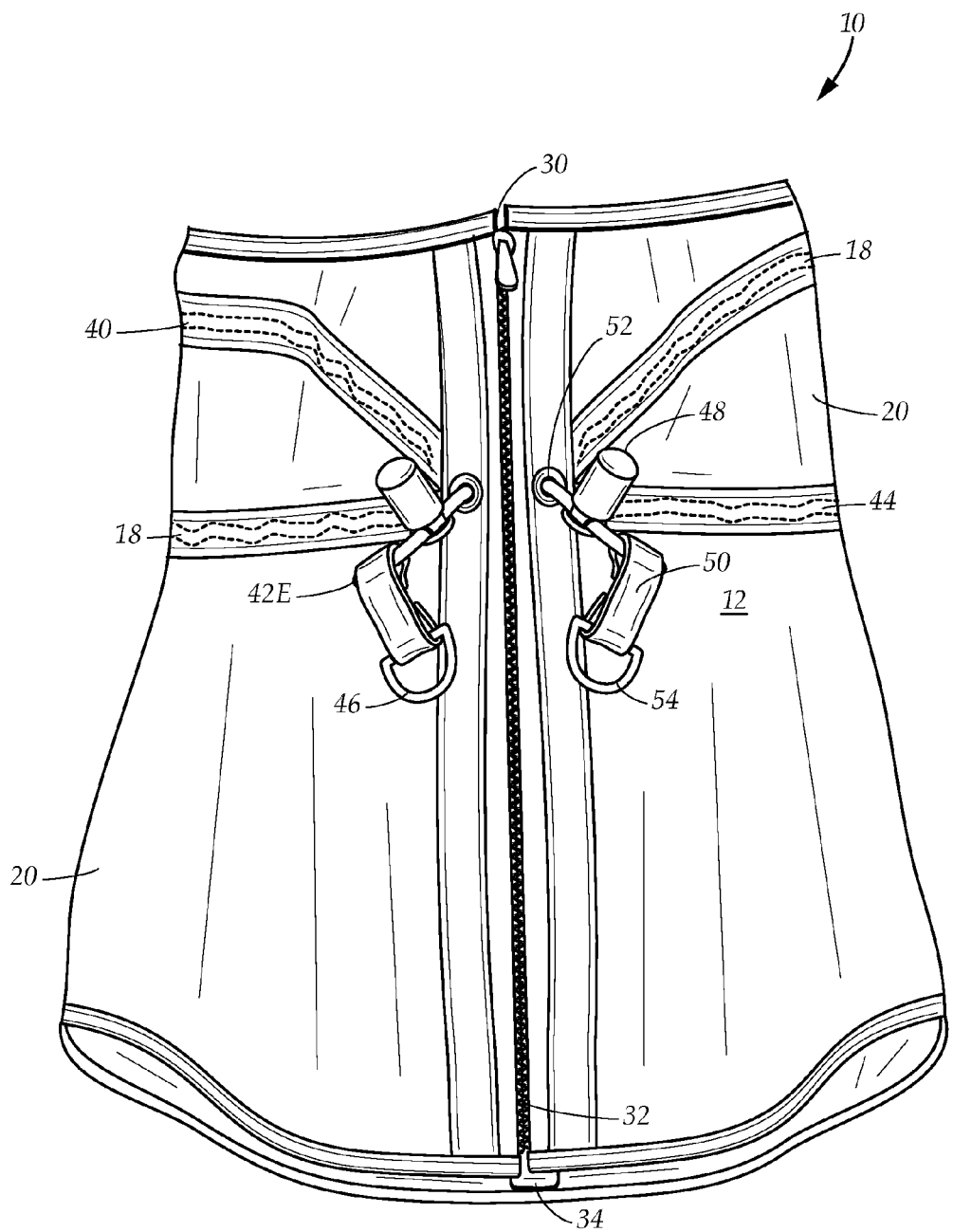
FIG. 2 is a perspective view from a dorsal side of an example embodiment of a closed pet garment.

FIG. 2 shows the dorsal side of the pet garment 10. The coat has an outer protective layer 12. In one example embodiment, the outer protective layer 12 is waterproof. In one example embodiment, the outer protective layer 12 is waterproof and windproof breathable fabric.

In one example embodiment, the outer protective layer has a plurality of reflective tape strips 18. In a further example embodiment, the tape strips 18 form channels 44 with the outer layer 12 by top stitching the outer layer 12.

The outside of the pet garment 10 has a plurality of leash connectors 46 attaching to the cording ends 42E, the harness being discontinuous, having a plurality of cording 42E ends converging at the opening 30. There is at least one leash connector 46 on each side of the opening 30, connecting the cording ends 42E to a leash when the garment 10 is placed on the pet and the opening 30 of the coat 20 is closed.

In the example embodiment, the leash connector 46 has a "D" ring 54 for connecting to the leash. Each cording end 42E has a cord lock 48 for adjusting the harness 40 around the pet. In a further example embodiment, the "D" ring connects to the cording ends 42E via webbing 50. In another example embodiment, the cording ends extend from the channels through a ferrule 52.

As explained with regard to FIG. 1, the coat 20 has the placket 34 on one side of the opening 30 such that when the fastener 32 closes the opening 30, the placket 34 is underneath the fastener 32 as shown in FIG. 2.

As shown in FIGS. 1-2, the fastener 32 is a zipper. However, those of ordinary skill understand that the fastener is not limited to a zipper, but can be selected from other closures systems such as snaps, hook and loop strips, buttons, frogs and toggles.

Figure 3:
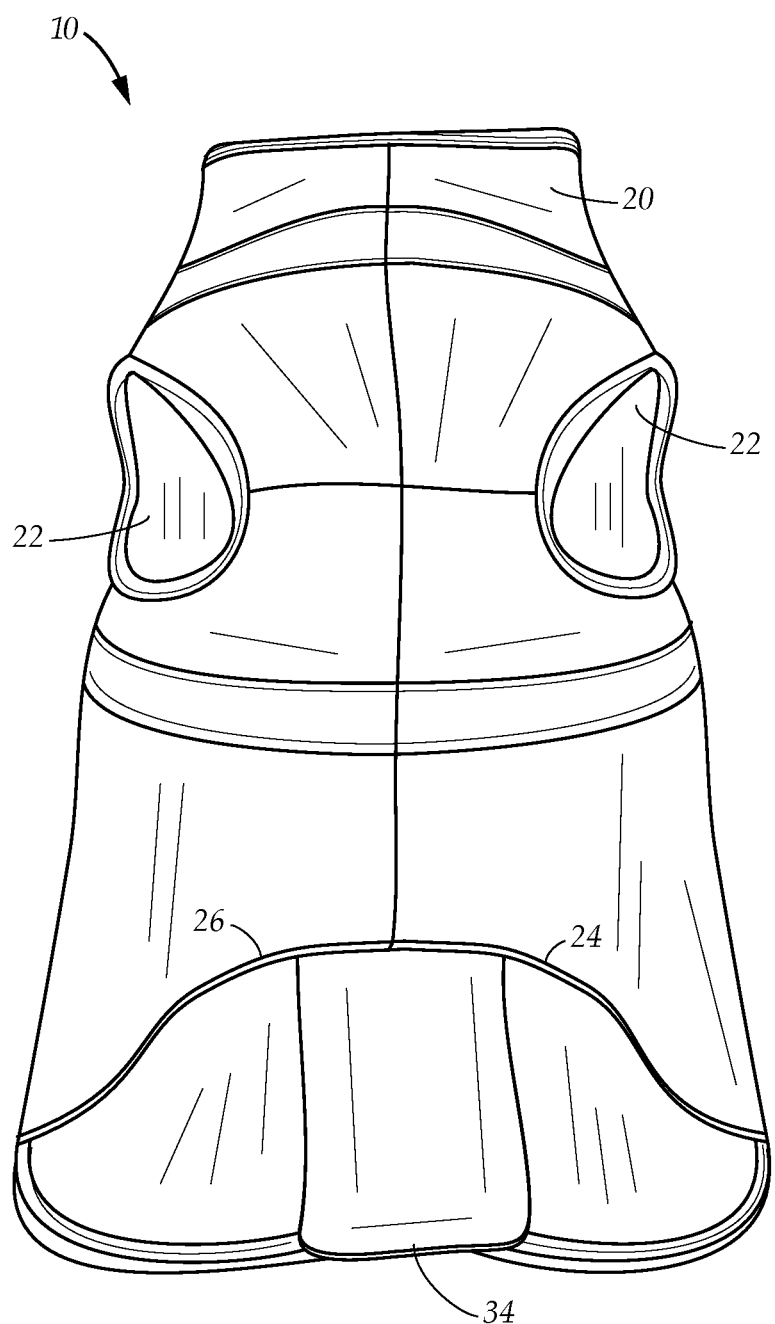
FIG. 3 is a perspective view from a ventral side of an example embodiment of a closed pet garment.

FIG. 3 shows the ventral side of the pet garment 10 when closed. The hemline 24 of the coat has a concave scallop 26 opposite the placket 34 configured for accommodating urination. The coat 20 covers the entire underbelly of the pet, ending just below the genital area, providing extra protection to the pet.

This design provides extra warmth in cooler weather without interfering with bodily functions. The coat 20 also acts to keep the pet's underbelly dry in wet weather. This design reduces the time and energy of "toweling off" pets upon their return indoors as well reduces that "wet pet" smell.

Figure 7:
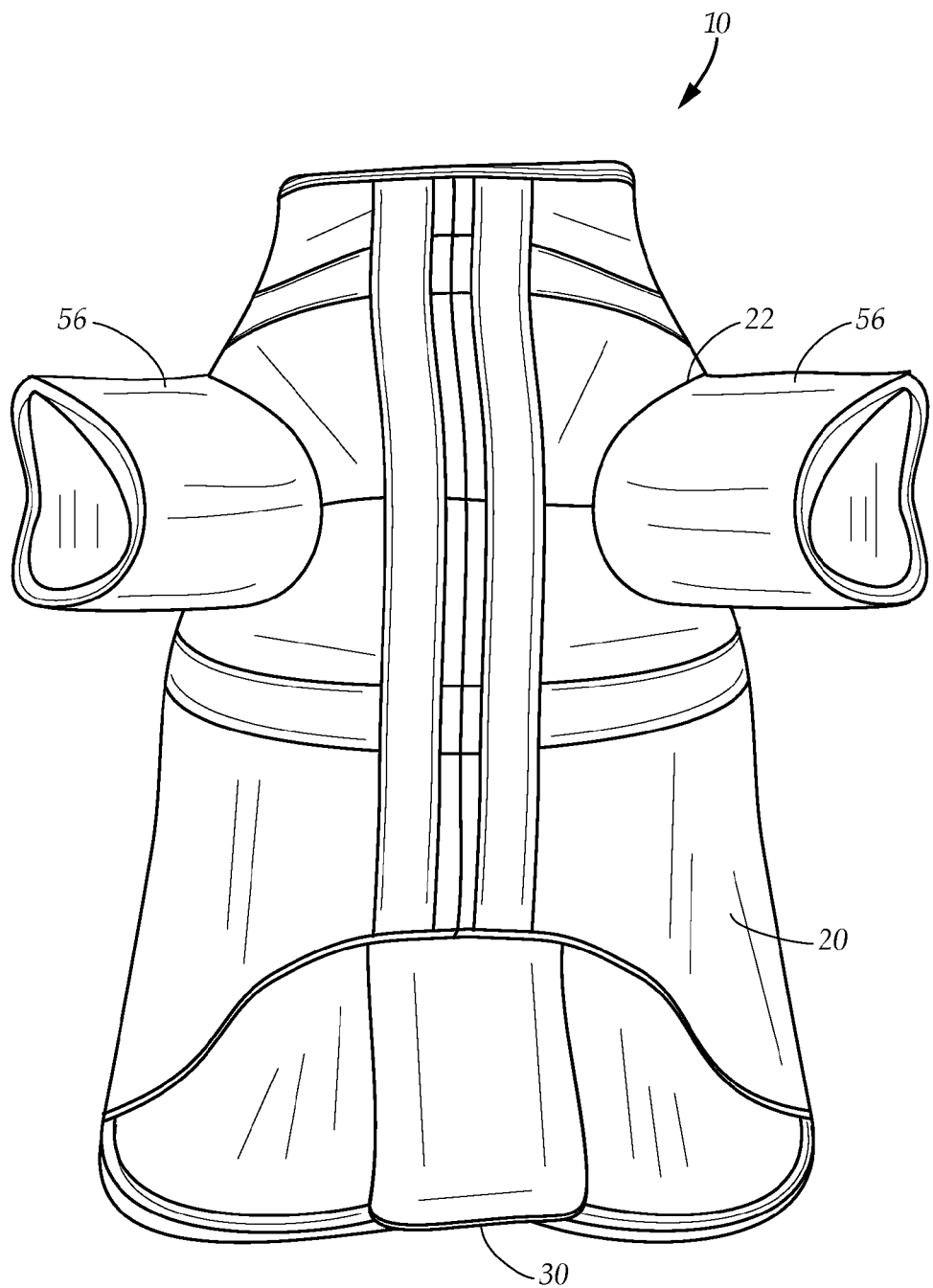
FIG. 7 is a perspective view from the top of another example embodiment of a closed pet garment having a pair of front sleeves.

In another example embodiment shown in FIG. 7, the pet garment 10 has a pair of sleeves 56 attaching to each foreleg openings 22 in the coat 20 configured for covering the pet forelegs.

Figure 8:
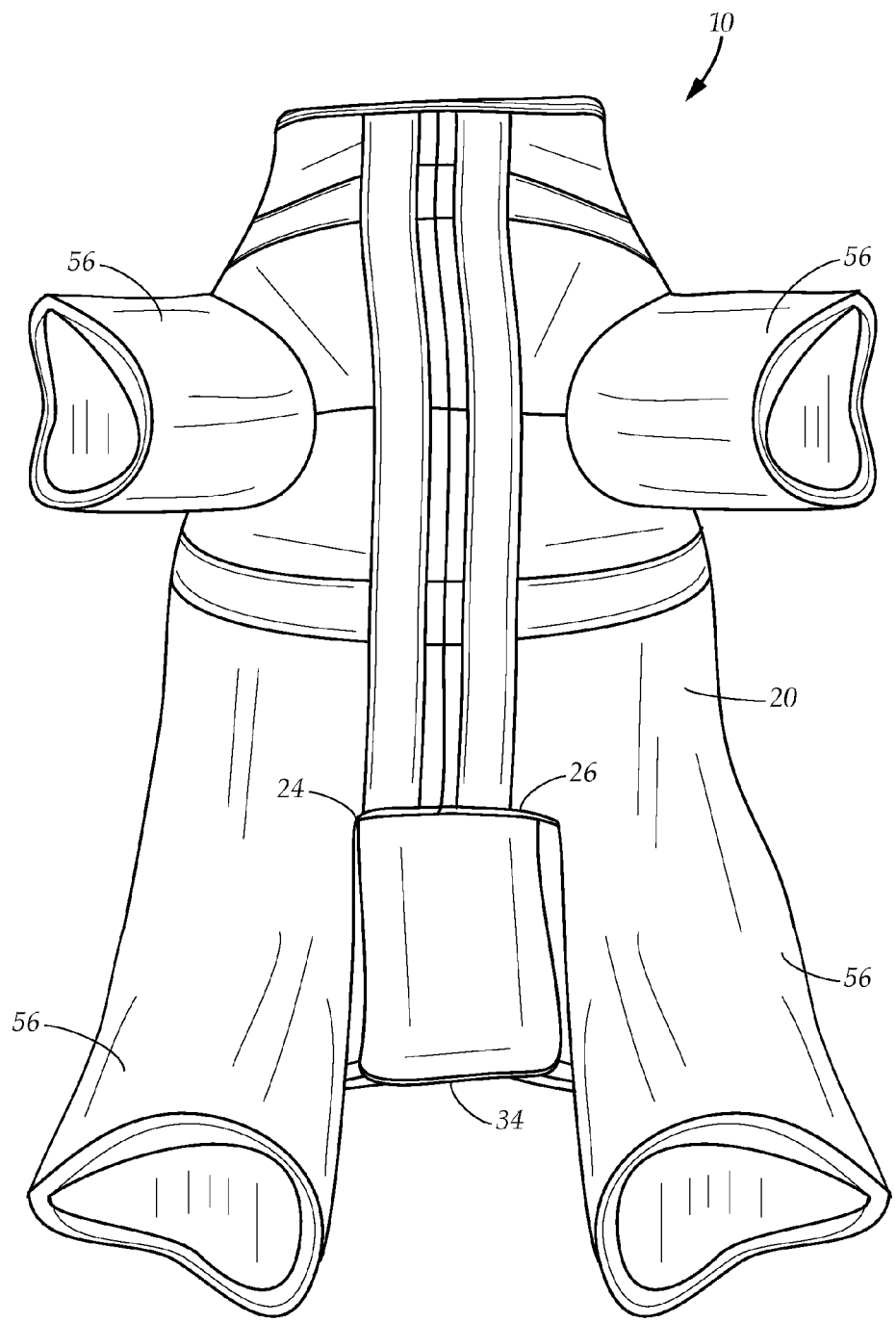
FIG. 8 is a perspective view from the top of another example embodiment of a closed pet garment having two pairs of sleeves.

In a further example embodiment shown in FIG. 8, a second pair of sleeves 56 is attached to the hemline 24 of the coat 20, one sleeve 56 on each side of the concave scallop 26, operative for covering the pet hind legs.

Figure 4:
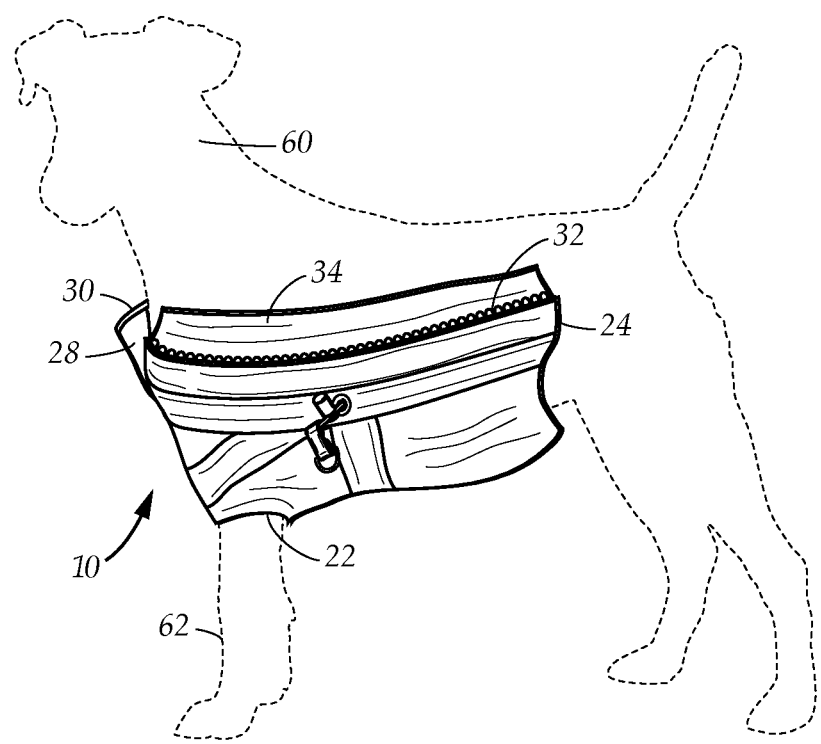
FIG. 4 is a perspective view of an example embodiment of a pet garment being placed on a pet.

A method of dressing the pet 60 in the pet garment 10 is shown in FIG. 4. The opening 30 is open extending from the hemline 24 to the neckline 28. The pet's forelegs 62 are placed by placing a first foreleg 62 into a first leg opening 22 and a second foreleg into a second leg opening. The opening 30 is closed with the fastener 32 by first bringing the opening sides together and coupling the sides with the fastener 32.

As the opening 30 is closed, the placket 34 is placed under the fastener 32 so that the fastener 32 is above the placket 34. When the fastener 32 is a full-length zipper, closing the opening is done by zipping the zipper from the hemline 24 to the neckline 28 after bringing the opening 30 sides together. In one example embodiment the zipper closes from neckline 28 to hemline 24.

Figure 6:
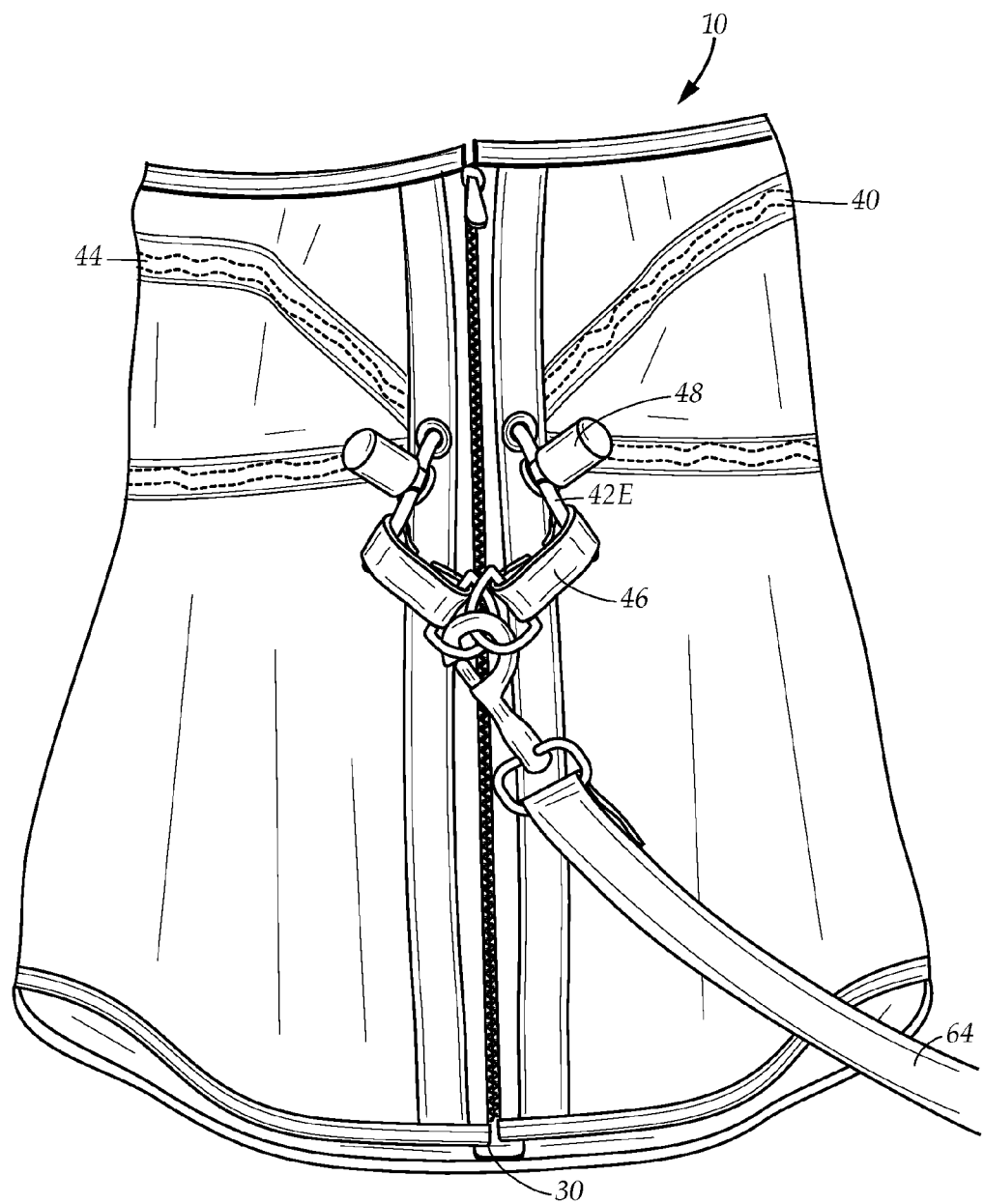
FIG. 6 is a perspective view from the dorsal side of an example embodiment of a closed pet garment with a leash attaching to a harness.

FIG. 6 shows the dorsal side of the garment 10 with the opening 30 closed. After closing the opening 30, the leash 64 is attached to the integrated harness 40 via a plurality of leash connectors 46 coupled to the cording ends 42E, the harness 40 threaded through the plurality of channels 44 in the coat 20, the channels ends on each side of the closed opening 30. The harness 44 is adjusted around the pet with a plurality of cord locks 48 on the cording ends 42E.

When the garment 10 has sleeves 56 for the forelegs as demonstrated in FIG. 7, the first foreleg is placed in the first sleeve 56 and the second foreleg is placed in the second sleeve 56 before the opening 30 is closed.

When the garment 10 has sleeves 56 for the legs, both forelegs and hind legs as demonstrated in FIG. 8, the first foreleg is placed in the first sleeve 56 of the first pair of sleeves, the second foreleg is placed in the second sleeve 56, the first hind leg is placed in the first sleeve 56 of the second pair of sleeves, the second hind leg is placed in the second sleeve 56 of the second pair of sleeves before the opening 30 is closed.

A method of manufacturing the pet garment is demonstrated in FIG. 1. The plurality of layers in the form of a coat 20 having a center seam 38, the neckline 28, the hemline 24, leg openings 22, one each side of the center seam and the lengthwise opening 30 extending from the neckline 28 to the hemline 24 is assembled.

The fastener 32 is coupled to the lengthwise opening 30 operative for closing the opening when the garment 10 is worn by the pet The channels 44 are created by topstitching the coat 20, the top stitching extending from the center seam 38 in a shoulder portion 36, the top stitching extending from the center seam in a torso portion 39 directly to the lengthwise opening 30, the top stitching converging at the opening 30.

Referring now to FIG. 1A, The leash connectors 46 attach to the harness cording ends 42E, at least one leash connector 46 on each side of the opening 30, the leash connectors connecting the harness cording ends 42E to the leash when the garment 10 is placed on a pet and the opening 30 of the coat 20 is closed.

The harness cording 42 is threaded through the channels 44 of the coat 20, the harness cording having a plurality of ends 42E extending through the channel ends on each side of the opening 30. Cord locks 48 are coupled to each harness cording end 42E and "D" rings 54 are attached to the leash connectors 46.

Referring again to FIG. 1, the coat 20 has a placket 34 on one side of the opening 30 created from the inner protective layer 14, such that when the fastener 32 closes the opening 30, the placket 34 is underneath the fastener 32 and the step of coupling the fastener 32 to the lengthwise opening 30 includes attaching the placket 34 to one side of the lengthwise opening 30 behind the fastener.

When the hemline 24 is sown, a concave scallop 26 is created opposite the opening 30 when the garment 10 is on the pet.

Figure 5:
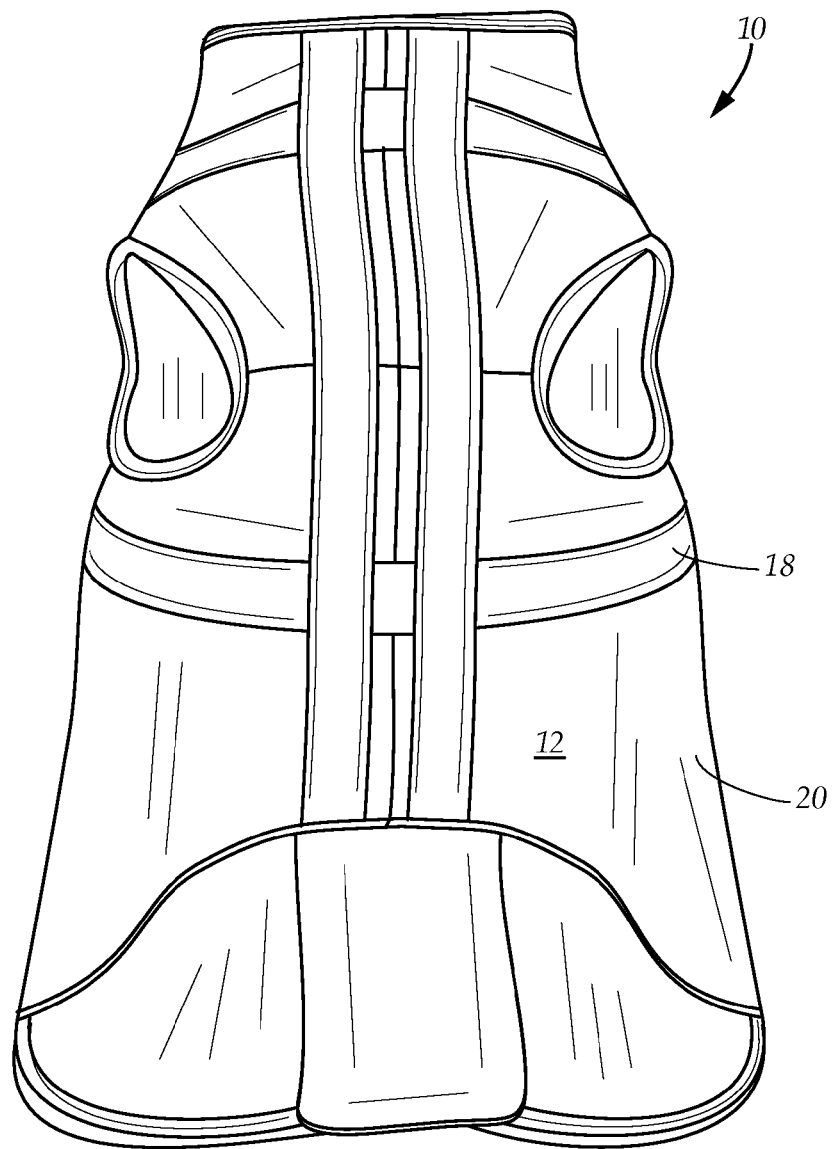
FIG. 5 is a perspective view from the ventral side of another example embodiment of a closed pet garment.

In one example embodiment shown in FIG. 5, reflective tape strips are sown on the outer layer 12 of the coat 20 after the channels are created between the outer protective layer 12 and the inner lining layer. In another example embodiment shown in FIG. 2, the tape strips 18 are top stitched onto the outer protective layer 12 forming the channels 44. In this embodiment, the inner layer is selectively removable and interchangeable.

Prior to topstitching the channels 44, in one example embodiment of the method, the cording 42 of the harness 40 is laid between the layers. Alternatively, the cording 42 is threaded through the channels 44.

In yet another example embodiment, as shown in FIG. 7, the step of assembling a plurality of layers in the form of a coat 20 includes attaching a pair of sleeves 56 to the foreleg openings 22, one sleeve for each foreleg opening.

In still another example embodiment, as shown in FIG. 8, the step of assembling a plurality of layers in the form of a coat 20 includes attaching two pairs of sleeves 56 to the coat, a first pair to the foreleg openings 22, one sleeve for each foreleg opening, and a second pair of sleeves 56 to the hemline 24 of the coat 20, one sleeve on each side of the concave scallop 26, operative for covering the pet hind legs.

The pet garment 10 fits all breed types, the length of the garment coming in a variety of lengths that accommodates miniature to giant breeds, in all lengths as measured from neck to base of tail from eight (8) inches to twenty-six (26) inches. In some example embodiments, the fabrics used have an elastic weave that accommodates the majority of common animal body types.

In this discussion, dogs are used as examples of pets whose owners would find the example embodiments disclosed herein advantageous. However, it is understood by those of ordinary skill that example embodiments disclosed herein are suitable for other pets, both typical and exotic, such as cats, domesticated wolves, wolfdogs, chimpanzees, hares, and other mammals that are members of canidae, felidae, primate and lagomorpha families. It is further understood that referring to dogs as examples of pets is not a limitation.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented a pet garment with an integrated harness. The disclosure is illustrated by example in the drawing figures, and throughout the written description. It should be understood that numerous variations are possible, while adhering to the inventive concept. Such variations are contemplated as being a part of the present disclosure.

What is claimed is:

1. A pet garment having an integrated harness, comprising: a coat having a plurality of layers, a neckline and a hemline, said coat having a lengthwise opening extending from the neckline to the hemline, the opening having a fastener, the fastener configured for selectively opening and closing said opening said coat having a plurality of channels, the channels located between the plurality of layers and terminating adjacent to the opening; a harness threaded through the channels of the coat, the harness having a plurality of ends extending through the channel ends on each side of the opening; and a plurality of leash connectors attaching to the harness ends, at least one leash connector on each side of the opening, the leash connectors connecting the harness ends to a leash when the garment is placed on a pet and the opening of the coat is closed; each end of the harness having a cord lock; each leash connector having a "D" ring, wherein the "D" ring connects to the end of the harness by webbing.

2. The pet garment as described in claim 1, wherein the coat has a plurality of layers comprising an outer protective layer and an inner lining layer.

3. The pet garment as described in claim 2, wherein the outer protective layer is waterproof.

4. The pet garment as described in claim 2, wherein the outer layer has a plurality of reflective tape strips.

5. The pet garment as described in claim 2, wherein the lining layer is a thermal insulating fabric appropriate for cold weather.

6. The pet garment as described in claim 2, wherein the lining layer is a mesh fabric appropriate for warm weather.

7. The pet garment as described in claim 1, wherein the coat has a placket on one side of the opening such that when the fastener closes the opening, the placket is underneath the fastener.

8. The pet garment as described in claim 1, wherein the fastener is a closure system selected from the group consisting of zippers, snaps, hook and loop strips, buttons, frogs and toggles.

9. The pet garment as described in claim 1, wherein the hemline has a concave scallop opposite the placket configured for accommodating urination.

10. The pet garment as described in claim 1, wherein the coat has a pair of leg openings configured for accommodating a pair of pet forelegs.

11. The pet garment as described in claim 1, wherein the neckline has a "V" shape at the opening.

\* \* \* \* \*